United States Patent
Lindenmaier et al.

(10) Patent No.: US 10,935,111 B2
(45) Date of Patent: Mar. 2, 2021

(54) SUPERPOSITION GEAR FOR A DRIVE SYSTEM

(71) Applicant: VOITH PATENT GMBH, Heidenheim (DE)

(72) Inventors: Jochen Lindenmaier, Herbrechtingen (DE); Bernd Lauter, Sontheim an der Brenz (DE); Tobias Seeberger, Dinkelsbuehl (DE)

(73) Assignee: Voith Patent GmbH, Heidenheim (DE)

( * ) Notice: Subject to any disclaimer, the term of this patent is extended or adjusted under 35 U.S.C. 154(b) by 0 days.

(21) Appl. No.: 16/489,858

(22) PCT Filed: Feb. 27, 2018

(86) PCT No.: PCT/EP2018/054755
§ 371 (c)(1),
(2) Date: Aug. 29, 2019

(87) PCT Pub. No.: WO2018/158222
PCT Pub. Date: Sep. 7, 2018

(65) Prior Publication Data
US 2020/0232544 A1    Jul. 23, 2020

(30) Foreign Application Priority Data

Mar. 3, 2017   (DE) ..................... 10 2017 104 467.1

(51) Int. Cl.
*F16H 3/72*  (2006.01)
*B60K 6/48*  (2007.10)
*B60K 6/365* (2007.10)

(52) U.S. Cl.
CPC .............. *F16H 3/724* (2013.01); *B60K 6/48* (2013.01); *B60K 6/365* (2013.01);
(Continued)

(58) Field of Classification Search
CPC ... F16H 3/724; F16H 2200/2005; B60K 6/48; B60K 6/365; B60K 2006/4825; F16D 2500/10412
See application file for complete search history.

(56) References Cited

U.S. PATENT DOCUMENTS 5,158,436 A * 10/1992 Jensen ................. H02H 7/0833
                                                    417/32
9,878,638 B2 * 1/2018 Wein ....................... B60L 15/32
(Continued)

FOREIGN PATENT DOCUMENTS

DE    102014210870 A1    12/2015
DE    102014225738 A1    6/2016
(Continued)

OTHER PUBLICATIONS

Machine translation of DE102014210870 filed Jul. 5, 2020 (Year: 2020).*

(Continued)

*Primary Examiner* — Tisha D Lewis
(74) *Attorney, Agent, or Firm* — Laurence A. Greenberg; Werner H. Stemer; Ralph E. Locher

(57) ABSTRACT

A drive system has a main electric drive and an auxiliary electric drive. A frequency converter controls a torque of the auxiliary drive. A planetary gear has a ring gear, a sun gear, a planet gear and a planet gear carrier. The ring gear is coupled to the main drive, the sun gear is coupled to an output shaft and the planet gear carrier is coupled to the auxiliary drive. A clutch path is disposed between the planet gear carrier and the input shaft. A controller operates the drive system in a first range with the clutch closed and the switching apparatus open, or in a second range with the clutch open and the switching apparatus closed. The controller is adapted to superelevate the torque of the auxiliary (Continued)

drive during a transition between the first and second ranges beyond the torque that the auxiliary drive is able to provide permanently.

9 Claims, 7 Drawing Sheets

(52) U.S. Cl.
CPC ............... *B60K 2006/4825* (2013.01); *F16D 2500/10412* (2013.01); *F16H 2200/2005* (2013.01)

(56) References Cited

U.S. PATENT DOCUMENTS

| | | | | |
|---|---|---|---|---|
| 10,661,649 | B2* | 5/2020 | Waldner | B60K 6/365 |
| 2009/0010094 | A1 | 1/2009 | Uemura | |
| 2011/0042155 | A1 | 2/2011 | Tarasinski et al. | |
| 2012/0319661 | A1* | 12/2012 | Moore | F16H 3/724 322/40 |
| 2018/0126836 | A1 | 5/2018 | Waldner et al. | |
| 2018/0201301 | A1* | 7/2018 | Leutner | B62D 5/046 |

FOREIGN PATENT DOCUMENTS

| | | | | |
|---|---|---|---|---|
| EP | 2535582 | A1 | 12/2012 | |
| WO | WO-2014173517 | A2 * | 10/2014 | .......... B60L 15/2036 |
| WO | WO-2016091958 | A1 * | 6/2016 | ................ H02P 1/54 |
| WO | 2016172742 | A1 | 11/2016 | |

OTHER PUBLICATIONS

Bargmeyer et al., "Facts Worth Knowing about Frequency Converters" Danfoss Handbook—VLT Frequency Converters, 2015, pp. 98-100 and 134 URL:http://drives.danfoss.de.knowledge-center/wuef# [found on the Internet Mar. 1, 2018]—English Version.

* cited by examiner

10,935,111 B2

SUPERPOSITION GEAR FOR A DRIVE SYSTEM

BACKGROUND OF THE INVENTION

Field of the Invention

The invention relates to a drive system with a superposition gear, a main drive and an auxiliary drive. In particular, the invention relates to a superposition gear that may be operated in two different operating states that correspond to a lower and upper speed range.

Prior Art

For drive in mechanical systems, e.g. a hoist unit, in the prior art a multi-motor arrangement is used in which a plurality of electric drive motors partially take over the power via a superposition gear (planetary gear), i.e. the speeds of the motors are summed together, while the torques respectively run parallel to the output via the sun gear or ring gear. One main drive and one or a plurality of auxiliary drives are ordinarily used, while operation without the main drive for safety reasons is preferably also possible.

DE 10 2014 210 870 A1 relates to a superposition gear based on a planetary gear in which the planet gear carrier may be coupled to the sun gear via a clutch. In a lower speed range, the clutch is closed and the drive is powered exclusively via an auxiliary drive that drives the planet gear carrier. In this case, the speed of the auxiliary drive may be controlled. The main drive is connected to the sun gear and is rotated via the closed clutch. A driven machine may be coupled with the sun gear. In a higher speed range, the main drive is engaged and the clutch is opened. The summation effect then allows the speed of the driven machine to be controlled by controlling the speed of the auxiliary machine. In total, the speed of the output shaft may be controlled in a range from 0 to 100% of a maximum speed.

Peak loads may occur particularly at the transition between the lower and upper speed ranges. To ensure that the superposition gear may be consistently controlled, all its elements must be sufficiently dimensioned, which may lead to a drive system that is large, heavy and expensive.

SUMMARY OF THE INVENTION

One of the basic tasks of the invention is to specify a technology that allows a drive system to be provided based on a plurality of smaller, lighter or cheaper drives that may be coupled by means of a superposition gear. The invention achieves this objective by means of the subject matter of the independent claims. Dependent claims reflect preferred embodiments.

A drive system for a driven machine comprising a main electric drive; a switching apparatus for connecting the main drive to a main electric power supply; an auxiliary electric drive; a frequency converter for controlling a torque of the auxiliary drive; an output shaft for connection to the driven machine; a planetary gear comprising a ring gear, a sun gear, a planet gear and a planet gear carrier, the ring gear being coupled to the main drive, the sun gear being coupled to the output shaft and the planet gear carrier being coupled to the auxiliary drive; a clutch path comprising a clutch for clutch or separating the planet gear carrier to or from the input shaft; and a controller. The controller is arranged to operate the drive system in a first range in which the clutch is closed and the switching apparatus is open, or in a second range in which the clutch is open and the switching apparatus is closed. In addition, the controller is adapted to superelevate the torque of the auxiliary drive during a transition between the first and second regions beyond the torque that the auxiliary drive is able to provide permanently.

This constellation may be particularly advantageous if it is necessary for the speed or torque of the driven machine to be controllable mainly in a medium or high speed range, in particular in the second operating range. If, for example, controllability is only required between 100% and approximately 60%, the auxiliary drives may be dimensioned to be small, so that they can only handle the start-up of the drive system in the first range, and are then briefly overloaded during the transition from the first range to the second range and are then supported by the main drive in the second range. The driven machine is preferably operated substantially or exclusively in the second range.

Superelevating the torque of the auxiliary drive may allow the auxiliary drive to be dimensioned so as to be weaker. This means that the auxiliary drive may be smaller, lighter or more cost-effective. If the auxiliary drive is made up of a plurality of motors, a plurality of motors may be better combined into one larger motor, or one motor may be replaced by a plurality of smaller motors. Improved efficiency in the operation of the drive system may be achieved. Due to the smaller dimensioning of the auxiliary drive, in particular, the installation of reserves that are practically unused may be avoided.

In general, one or a plurality of auxiliary drives may be furnished. In the following, for the sake of simplicity, only one auxiliary drive referred to, if one or a plurality of mechanically parallel connected drive devices are meant.

It is preferable that one or a plurality of auxiliary drives be dimensioned in such a way that, in a range from a rated speed of the main drive upwards, the sum of the torques that the auxiliary drives are able to provide permanently is smaller than the torque requirement of the driven machine. The driven machine usually has a torque requirement that depends on its speed and follows a predetermined course. For example, the torque may be a function of the second or third power of the speed. The transition between the first and second range is usually made at or near the rated speed of the main drive. Due to the weaker dimensioning of the auxiliary drives, the transition between the ranges may no longer be carried out solely based on the permanent torque that the auxiliary drives provide, because the auxiliary drives cannot fulfill the torque requirement of the driven machine in this way. Due to the brief superelevation in torque, however, the actually undersized auxiliary drives may provide sufficient torque to enable the transition for just as long as needed in order to enable the transition between ranges. The operability of the auxiliary drives cannot be affected as a result.

In a preferred embodiment, the auxiliary drive comprises an asynchronous motor. These electric drive machines are usually capable of being overloaded from the start. A typical asynchronous machine may, for example, be subjected to up to twice its permanently available torque or up to 1.5 times its permanently convertible power without permanent damage.

Typically a maximum temperature determines the limit of the power of the auxiliary drive, and is generally dependent on external operating conditions as well as the converted mechanical power and a load curve. The drive system may therefore comprise a temperature sensor on the auxiliary drive that is preferably connected to the controller. The controller may be so devised as to superelevate the auxiliary drive torque only when the sampled temperature is below a predetermined threshold. In this way, a thermal load on the auxiliary drive may be taken into account, which may for example be due to an ambient temperature or an increase in torque that has already occurred.

In another embodiment, the drive system comprises a temperature sensor on the frequency converter, the temperature sensor preferably being connected to the controller. The controller preferably is adapted to superelevate the torque of the associated auxiliary drive only when the sampled temperature is below another predetermined threshold. The frequency converter preferably comprises a supply device for providing a DC voltage from an auxiliary electrical network providing alternating current and an inverter for providing an AC voltage for operating the auxiliary drive, typically in three electrical phases. A supply device may be set up to supply a plurality of inverters, which may be associated with different auxiliary drives. The temperature sensor may be used in the supply device or in the inverter. Each temperature sensor may be associated with its own threshold value. A plurality of temperature sensors may also be used on the same device, for example on individual high-performance semiconductors.

The frequency converter may be dimensioned in such a way that a current that it is able to provide permanently is not sufficient to superelevate the torque of the associated auxiliary drive. In other words, the frequency converter or a component thereof may also be designed to be overload-capable. Superelevating the torque of the auxiliary drive may then require overloading the frequency converter. Consequently, the frequency converter may be dimensioned to match the auxiliary drive in continuous operation. A typical frequency converter is designed to withstand an overload of approximately 50% over a period of approximately 10 seconds. These values may be increased by an only slightly larger dimensioning of the frequency converter elements. A frequency converter with smaller dimensions may also typically be chosen for the smaller auxiliary drive, so that costs, a size or a weight may be reduced.

The frequency converter may be dimensioned in such a way that a permanent current that it provides is sufficient to operate the associated auxiliary drive under overload. For this purpose, in one embodiment the frequency converter may provide approximately 1.5 to 1.7 times the current of the auxiliary drive in continuous operation. An even stronger configuration is also possible.

If a plurality of auxiliary drives are furnished, the controller may be arranged to superelevate the torques that the auxiliary drives provide in a staggered manner over time. For example, the superelevation in torque of the auxiliary drives may be started in one drive after the other until sufficient torque is able to be provided. After the transition between the first and the second range, the superelevations may be stopped one after the other. In another exemplary embodiment, a first auxiliary drive is overloaded during a first change between the operating ranges and another is overloaded during a subsequent change. The auxiliary drive to be overloaded may be selected based on the auxiliary drive temperatures.

A method of controlling the above-described drive system, comprising the steps of operating the drive system in a first range in which the clutch is closed and the switching apparatus is open, or in a second range in which the clutch is open and the switching apparatus is closed; controlling the frequency converter such that the torque of the auxiliary drive is superelevated beyond the torque the auxiliary drive is able t permanently provide; changing the operating range; and terminating the superelevation in torque.

The method may be carried out or controlled in particular by means of the above-described controller. To this end, the controller may comprise a programmable microcomputer or microcontroller and the method may take the form of a computer program product that may run on the controller or may be stored on a computer-readable medium. Features or advantages of the controller may be applied to the method, and vice versa.

BRIEF DESCRIPTION OF THE SEVERAL VIEWS OF THE DRAWING

The invention is now described in greater detail with reference to the attached drawings, which show the following.

DESCRIPTION OF THE INVENTION

Figure 1:
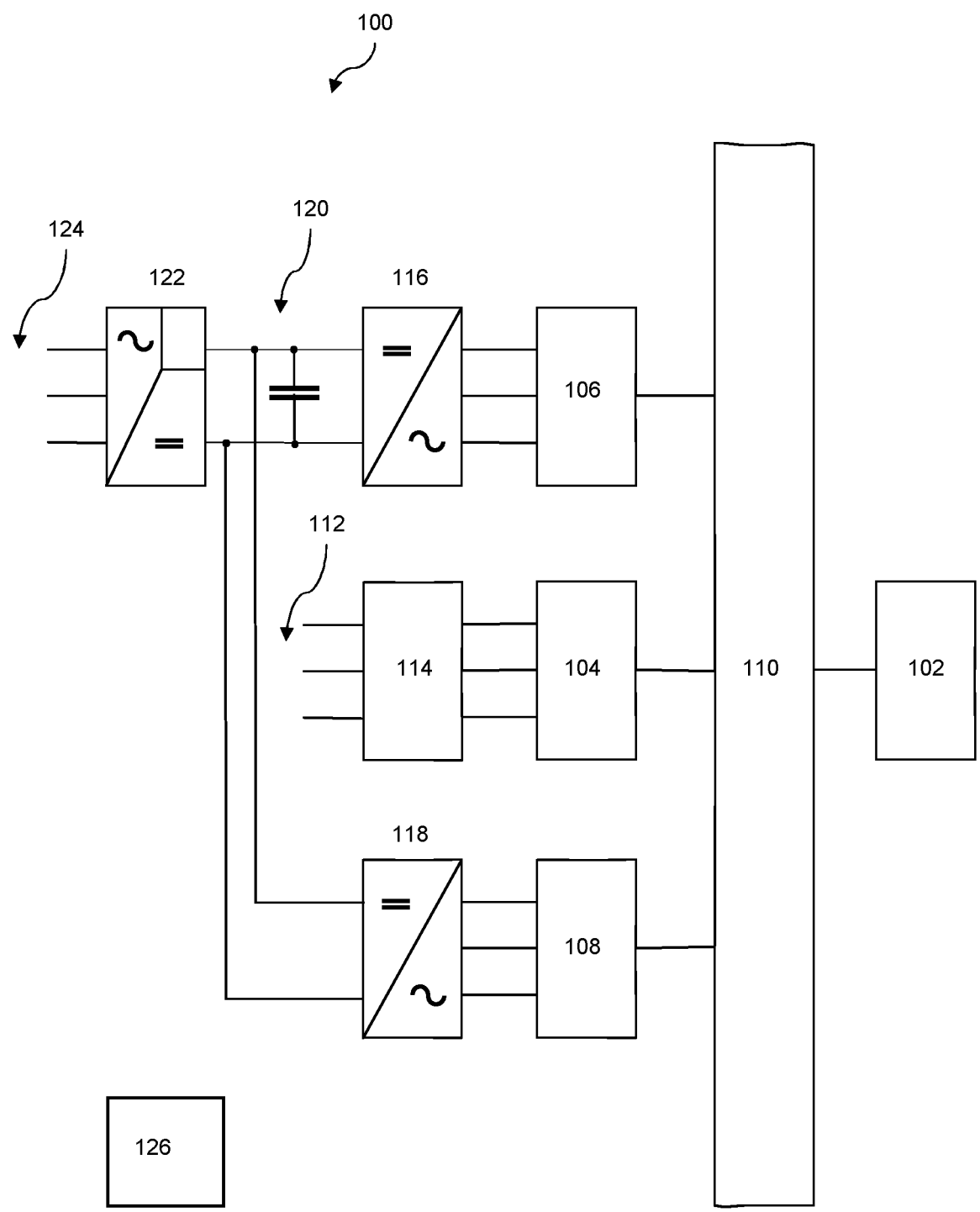
FIG. 1 a drive system.

FIG. 1 shows a schematic representation of a drive system 100. To drive a driven machine 102, a main electric drive 104 is furnished as well as auxiliary electric drives 106 and 108, and these are coupled to the machine 102 by means of a superposition gear 110 in such a manner as to convey torque. In other embodiments, only one auxiliary drive 106 may be used, or more than two auxiliary drives 106, 108 may be used.

The driven machine 102 may for example comprise a centrifugal pump, a centrifugal compressor, a blower, a compressor or a coal pulverizer. The operation of the driven machine 102 may be critical for the operation or safety of a higher-level facility such as a power plant or a heating system. Via the superposition gear 110, the driven machine 102 may alternatively be driven by the main drive 104, one or a plurality of the auxiliary drives 106, 108, or a combination of these. As will be explained in more detail below, different operating states of the superposition gear 110 may be supported.

A main electric power supply 112 may be either connected to or disconnected from the main drive 104 by means of a switching apparatus 114. The main drive runs at a predetermined rated speed when it is connected to the main power supply 112. The auxiliary drives 106 and 108 may preferably be controlled by means of associated inverters 116 and 118, which are supplied from a DC link 120 that provides a DC voltage. The inverters 116, 118 may respectively control a speed or a torque that the associated auxiliary drive 106, 108 provides. To this end, a frequency or voltage provided to the respective auxiliary drive 106, 108 may be varied. The auxiliary drives 106, 108 are preferably controlled via field-oriented control or regulation. A supply apparatus 122 typically provides the DC voltage of the DC link 120, which is required for the inverters 116, 118, from an auxiliary electrical network 124. The auxiliary power supply 124 is usually separated from the main power supply 112 and has a lower load capacity. The combination of supply apparatus 122 and inverter 116, 118 is also called a frequency converter.

A controller 126 is set up to control the drive system 100 and in particular the superposition gear 110, and in particular to adjust the speed of the output shaft 240 to a preset value. The superposition gear 110 may have different operating states, which may be set, in particular, as a function of a speed that is required at the driven machine 102. The controller 126 may transparently control the transition between the operating states, so that the drive system 100 may only require the set speed of the driven machine 102 as the external reference variable. To control the drive system 100, the controller 126 may control one or a plurality of mechanical elements of the superposition gear 110 and/or one of the inverters 116, 118 to influence a speed or torque of an auxiliary drive 106, 108. Where applicable, the controller 126 is also connected to one or a plurality of sensors for sensing an operating state of the drive system 100.

Figure 2:
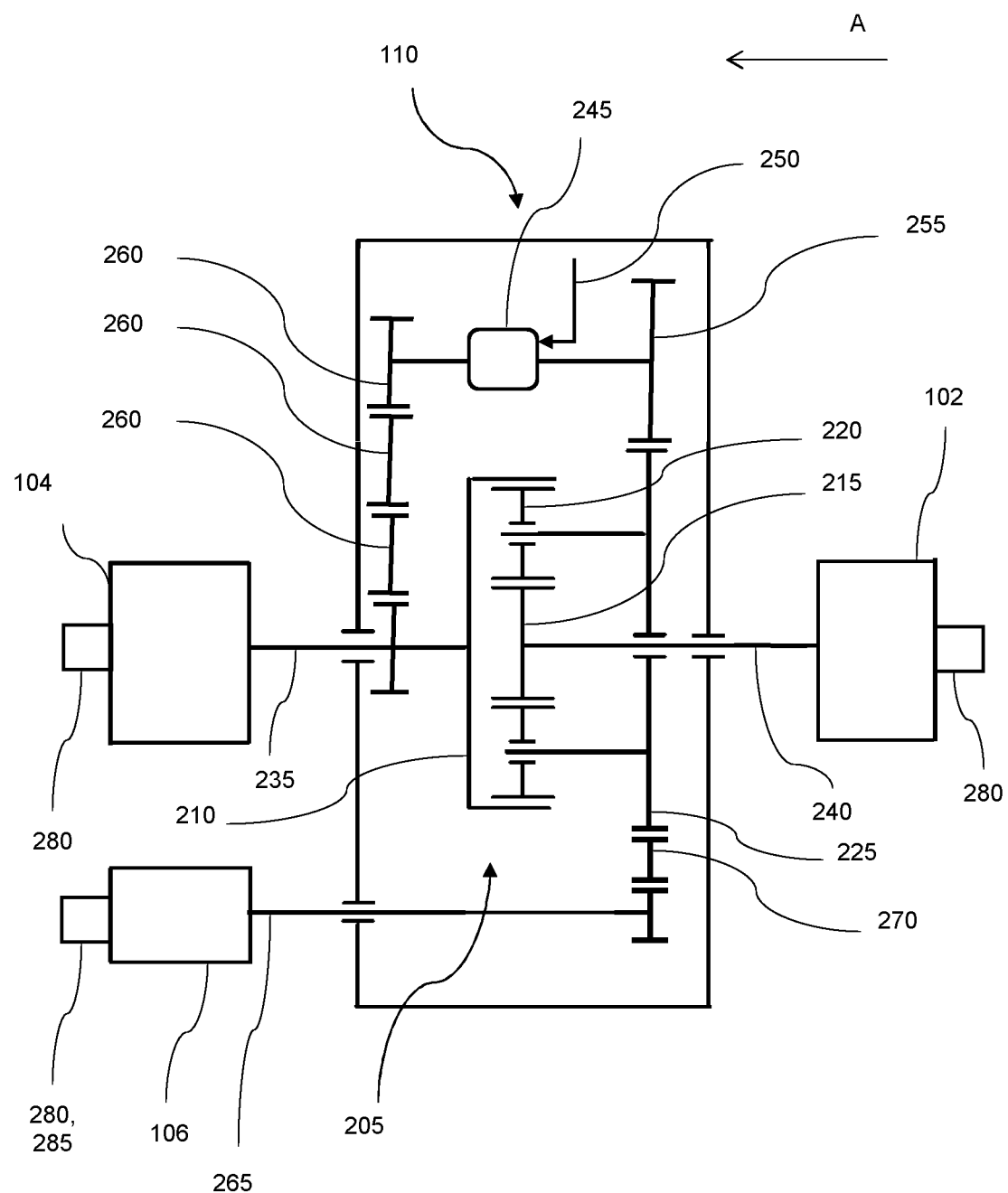
FIG. 2 a superposition gearing.

FIG. 2 shows a preferred embodiment of a superposition gear 110 for use in a drive system 100 as shown in FIG. 1. For clarity's sake, only one auxiliary drive 106 is shown in addition to the main drive 104, but typically at least one additional auxiliary drive 108 is furnished (see FIG. 1). The auxiliary drives 106, 108 are typically mechanically connected in parallel and may be electrically controlled, individually or jointly.

The superposition gear 110 comprises a planetary gear 205 with a ring gear 210, a sun gear 215, at least one planetary gear 215 and a planet gear carrier 225. The planetary gear 215 engages with the ring gear 210 and the sun gear 215 and is rotatably mounted against a pin 230 that is attached to the planet gear carrier that is concentrically rotatable around the sun gear 215. The ring gear 210 is connected to a drive shaft 235 for connecting to the main drive 104, and the sun gear 215 is connected to an output shaft 240 for connecting to the driven machine 102. The planetary gear 205 forms a summing gear that may additively or subtractively combine the rotary movements of the main drive 104 and auxiliary drive 106 and transmit them to the driven machine 102.

Also furnished is a switchable clutch 245 that may be opened or closed by means of an actuator 250. The clutch 245 may operate with a positive or frictional fit or via hydrodynamic conversion, and is designed to feedback the rotary movement of the planet gear carrier 245 to the input shaft 235 or ring gear 210. Instead of one clutch 245, a plurality of mechanically parallel clutches 245 may also be furnished, for example to make the individual clutches 245 more compact or to make better use of the available installation space. In the embodiment shown, one side of the clutch 245 is coupled to the planet gear carrier 245 by means of a gear stage 255 and the other side is coupled to the input shaft 235 by means of a series of transmission wheels 260. Another gear stage may be formed by means of the transmission wheels 260. The entire transmission of the rotary movement from the planet gear carrier 225 to the ring gear 210 is called the clutch path.

In the embodiment shown, the auxiliary drive 106 is connected to the planet gear carrier 225 via an auxiliary shaft 270 and preferably an additional gear stage 270. In this embodiment, one side of the clutch 245 may also be connected to the gear stage 270 and the other side may be connected to the drive shaft 235 via the transmission wheels 260. Gear ratios of the gear stages 255, 270 may respectively be selected as required.

The following definitions apply generally:
n1: Speed of output shaft 240=Speed of sun gear 215
n2: Speed of main drive 104=Speed of ring gear 210
n3: Speed of auxiliary drive 106, 108 n-intermediate shaft: Speed in clutch path (at the clutch 245)

$i_{PG}$: Gear ratio of planetary gear 205 (=n1/n2)

$i_{SG1}$: Gear ratio of gear stage (270) (=n3/n-planet gear carrier 225)

$i_{SG2}$: Gear ratio of gear stage (255) (=n2/n3 or =n-intermediate shaft/n-planet gear carrier 225)

$i_{SG3}$: Transmission to gear stage (260) (=n-intermediate shaft/n2)

In a lower speed range, the driven machine 102 may be driven with the main drive 104 switched off and the clutch 245 closed, up to a speed that is determined by the performance of the auxiliary drive 104 and the load capacities of the clutch 245, the planetary gear 205, the gear stages 255, 270 and the transmission wheels 260. This speed is typically approximately 40-60% of the maximum speed of the output shaft 240. In this case, the speed of the driven machine 102 may be controlled from standstill via the speed of the auxiliary drive 106, 108. The speed of the main drive 104 is coupled to the speed of the auxiliary drive 102 via the clutch 245.

In an upper speed range, the driven machine 102 may be driven up to maximum speed with the main drive 104 switched on and the clutch open. The speed of the main drive 104 cannot be controlled, but typically runs at a fixed rated speed. The lowest output shaft speed in this operating state is determined by the rated speed of the main drive 104. By controlling the auxiliary drive 106, the speed of the output shaft 240 may be increased up to the maximum speed, which depends on the speed stability of the auxiliary drive 106 and on the load capacity of the superposition gear 110.

During a transition between the lower speed range (first operating condition or range I) and the upper speed range (second operating condition or range II), the speed of the auxiliary drive 106 and the operating state of the clutch 245 are usually changed. For a low-wear transition, the lower speed range is preferably selected so that the main drive 104 may reach its rated speed by driving the superposition gear 110 by means of the auxiliary drive 106 alone. If the main drive 104 is switched on at its rated speed, a load on the main power supply 112 may be kept low. In particular, a high startup current, which is otherwise required for accelerating the rotor of the main drive 104 and may be approximately 8 times the persistent current, may be omitted.

For speed control and overload protection, speed sensors 280 may be furnished on the main drive 104, the auxiliary drive 106 and/or the driven machine 102. If the opening state of the clutch 245 is known, one of the speeds may be determined from the other two, so that two speed sensors 280 on the superposition gear 110 may be sufficient. Optionally, to prevent thermal overload, a temperature sensor 285 may also be furnished on one of the auxiliary drives 106, 108. A temperature sensor 285 may also be furnished on the inverter 116, 118 or on the supply device 122 in FIG. 1.

Figure 3:
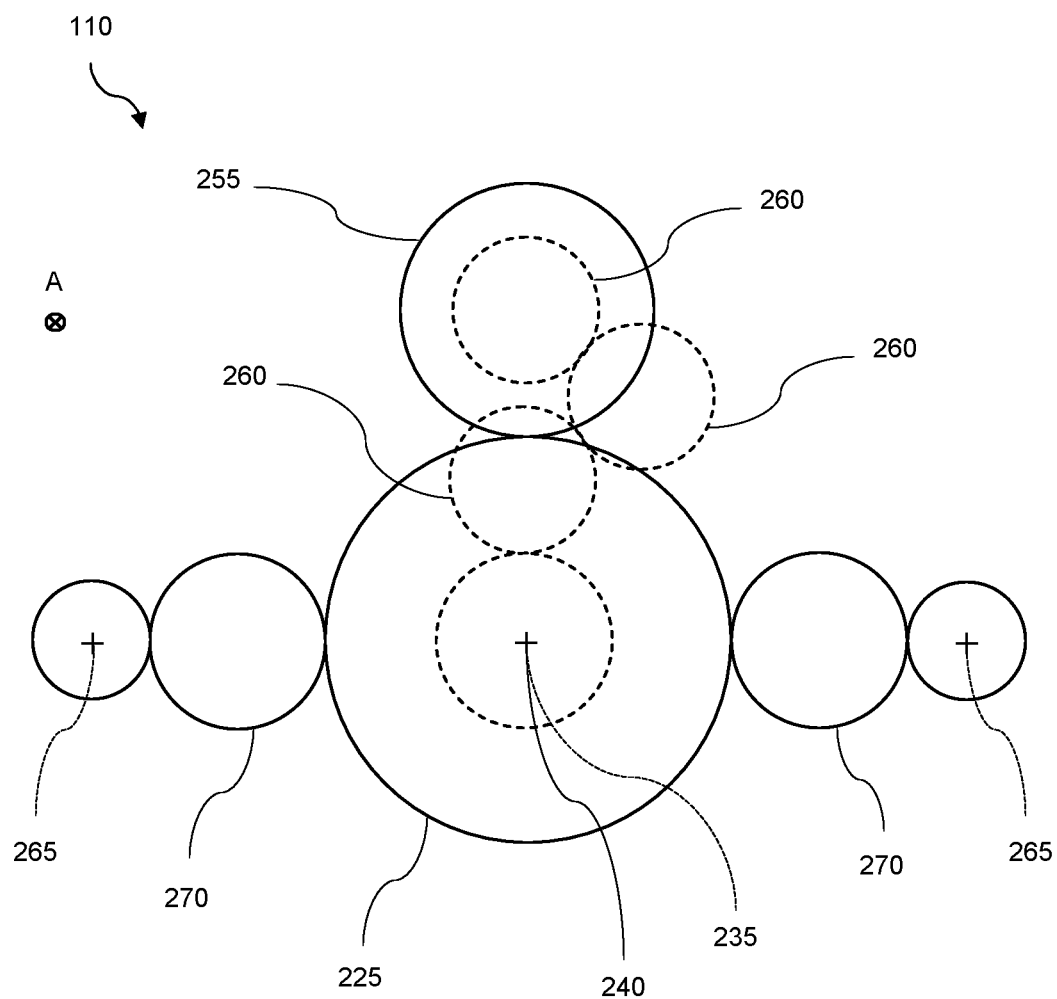
FIG. 3 an arrangement of shafts in a superposition gear.

FIG. 3 shows an exemplary embodiment of an arrangement of the input shaft 235, auxiliary shaft 265 and output shaft 240 on a superposition gear 110. Hidden elements are shown with broken lines. The viewing direction with respect to the embodiment shown in FIG. 2 is marked A. Unlike the embodiment shown in FIG. 2, here two auxiliary shafts 265 are furnished on opposite sides of the output shaft 240. The clutch 245 is preferably furnished in the range of the gear stage 255, so that the rotational axes of the clutch 245 and the auxiliary drives 106, 108 run through corners of a triangle that is in particular an isosceles triangle. The drive shaft 235 is preferably concentric to the output shaft 240.

Figure 4:
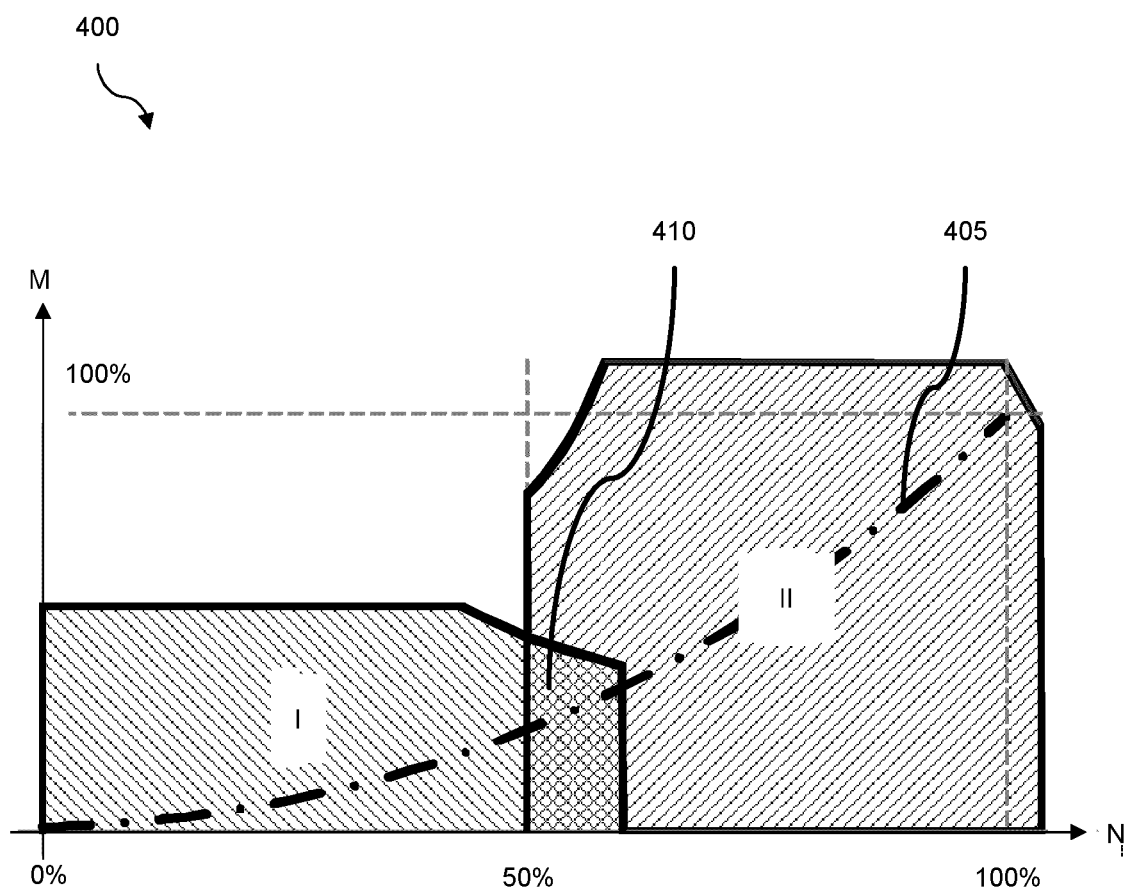
FIG. 4 a control diagram of a drive system.

FIG. 4 shows an exemplary control diagram 400 of the drive system 100 with the superposition gear 110. In the horizontal direction, a speed N of the driven machine 102 is indicated as part of a predetermined maximum speed, and in the vertical direction a relative torque M is indicated as part of a predetermined maximum torque. A characteristic curve 405 shows the torque requirement of a driven machine 102, chosen by way of example, with respect to speed. The torque M of the characteristic curve 405, by way of example, follows a quadratic or cubic function of the speed N. The more the torque M of characteristic curve 405 rises with speed N, the smaller is the relative torque at low speeds. The characteristic curve 405 may also show stronger growth, for example if it follows a higher-order polynomial. If sufficiently powerful auxiliary drives 106, 108 are used, a slower-growing function, for example a linear function, may also be supported.

A range I shows possible operating points of the superposition gear 110 when the main drive 104 is switched off and the driven machine 102 is driven exclusively by the auxiliary drives 106, 108. In this case, the clutch 245 is closed. A range II shows possible operating points with the main drive 104 switched on and the clutch 245 open. To control the driven machine 102 over the entire speed range from 0% to 100%, ranges I and II must overlap in a range 410 and at least one point of the characteristic curve 405 of the driven machine 102 must be contained in this range 410. Approximately 20-30% electrical control power must be installed on the auxiliary drives 106, 108 for this configuration, as a function of the available speed spread and the characteristic curve 405. Thus a speed control range of 50-100% is realized for range II and the transmission of the clutch path must be selected in such a way that range I covers a speed range up to at least 50% of the maximum speed of the output shaft 240. Preferably, the resulting gear ratio via the clutch 245, between the auxiliary electric drives 106, 108 and the input shaft 235, is chosen so that the rated speed of the main drive 104 is likewise within the overlap range 410. In this case the operating state transition between range I (main drive 104 is disabled) and range II (main drive 104 is enabled) may be made by opening the clutch 245 by means of actuator 250 and connecting the main drive 104 to the main electric power supply 112 at or near its rated speed. The configuration described permits virtually continuous speed control of the driven machine 102 along the load characteristic curve 405.

In many applications, however, it is not necessary to be able to control the speed of the driven machine 102 over the entire speed range, but only in a medium and high speed range, for example only between 60% and 100%. In this case the auxiliary drives 106, 108 are overdimensioned to allow the described change of operating state; as a result, the drive system 100 may be larger and heavier and additional costs may be incurred for the large dimensions of the auxiliary drives 106, 108 of the associated inverters 116, 118 as well as the supply device 122. It is therefore proposed that the auxiliary drives 106, 108 should be dimensioned weaker.

Figure 5:
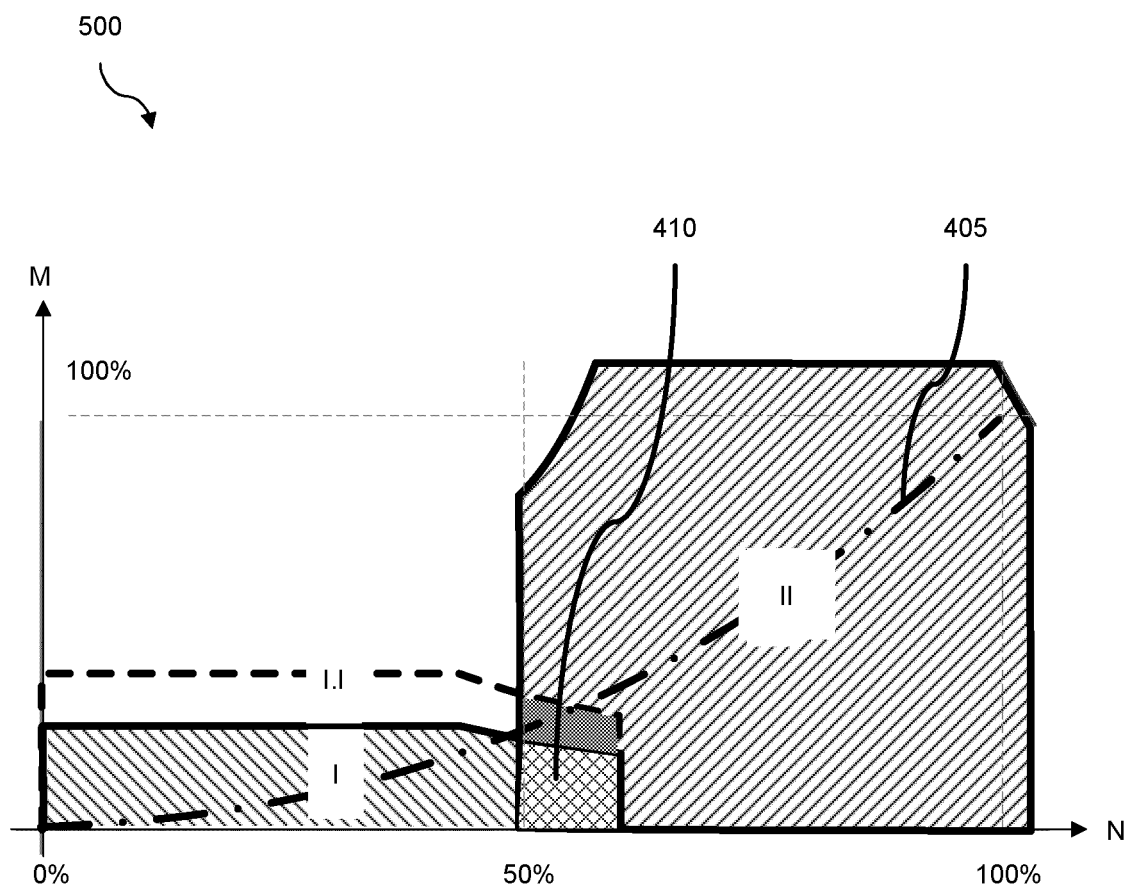
FIG. 5 another control diagram.

FIG. 5 shows another control diagram 500 presented as in FIG. 4. In this case, the power of the auxiliary drives 106, 108 is smaller, so that range I is flatter in the vertical direction than in FIG. 4. However, the characteristic curve 405 no longer shares any common point with the range 410 in which ranges I and II overlap. As a result, it is not possible to have a quasi-continuous operating state transition between ranges I and II as was described above, which permits activating the main drive 104 and thus seamlessly controlling the speed of the driven machine 102.

It is also proposed to take advantage of an overload capacity of the auxiliary drives 106, 108 so that range I may be extended to range I.I for a short time. The range I is briefly extended in the direction of the torque M—but not in the direction of the speed N. Accordingly, the overlap range 410 is likewise greater, so that the characteristic curve 405 cuts it in at least one point. In this intersection range, the change in operating state between ranges I and II may be carried out. This procedure makes it possible to use auxiliary drives 106, 108 with smaller dimensions and still enable a smooth and gentle transition between ranges I and II. This technique is particularly suitable for applications in which the output shaft speed needs to be controlled mainly in an upper speed range, for example in a range of 60-100%, 75-100% or 80-100% of the maximum speed.

The auxiliary drives 106, 108 may in particular be designed as electric asynchronous machines, so that the torque they provide may be up to approximately 2 times the rated torque for a short time and the power provided may be up to approximately 1.5 times the rated power for a short time. The rating thresholds relate to continuous operation that may be maintained permanently without further restrictions. How large the elevated power provided by the auxiliary drives 106, 108 actually is, and how long it may be delivered, usually depends on the temperatures of the auxiliary drives 106, 108.

In one embodiment, the temperature of an auxiliary drive 106, 108, for example a winding temperature of its stator winding, is recorded by means of a thermistor (PTC) or a measuring resistor (e.g. Pt100). If the temperature exceeds a predetermined threshold, the inverters 116, 118 may be controlled so as to reduce the power provided. Such monitoring may be particularly useful for applications that require explosion protection requirements and also require that the auxiliary drives 106, 108 follow these requirements, for example in offshore or underground applications. In these applications the auxiliary drives 106, 108 may be operated in the I.I. range only for a very short period of time. In this case, the drive system 100 should be designed in such a way that the permissible dwell time in range I.I reliably permits changing the operating state.

The inverters 116, 118 or the supply device 122 used may also limit the overload capacity of the drive system 100. This restriction may apply in particular to applications of the drive system 100 without explosion protection requirements. Typical switching and rectifying elements within components 116, 118 and 122 may be overloaded for a period of approximately 10 seconds above their rated current or rated power. To protect against overload, components 116, 118 or 122 may also be monitored for overtemperature.

In any case, the electrical switching and rectifying elements within components 116, 118 and 122 should be dimensioned in such a way as to ensure a safe transition between ranges I and II. For this, the components do not necessarily have to be designed stronger than in the prior art, because they could be dimensioned smaller at the outset, by way of adaptation to the weaker-dimensioned auxiliary drives 106, 108.

In another embodiment, the auxiliary drives 106, 108 may be operated in staggered order to allow thermal recovery of the components 116, 118 and 122 or parts thereof. Consequently, an increased dimensioning of the components 116, 118 and 122 may be unnecessary. The auxiliary drives 106, 108 may also recover thermally more quickly or to a greater extent if they are operated at a time offset.

The power flow through the superposition gear 110 when changing between range I and range II is considered below, again referring to FIG. 2.

At the transition from range I to range II, closing the clutch 245 causes the planet gear carrier 225 to be coupled with the drive shaft 235 or ring gear 210. As a result, the output shaft 240 is the only remaining single shaft of the planetary gear 205. The planet gear carrier 225 becomes the free clutch shaft and the ring gear 210 becomes the connected clutch shaft. If the clutch 245 is closed, the superposition gear 110 is operated in two-shaft operation as a compulsory gearing with 1 degree of freedom. Thus, only one speed is predetermined on the planetary gear 205, and this speed is imposed via one or both auxiliary drives 106, 108. The speeds of the input shaft 235 and output shaft 240 are determined by the configuration of the superposition gear 110, in particular the planetary gear 205 and the gear stages 255 and 280.

The clutch gives rise to a circulating power flow called idle power, because the operating point of the superposition gear 110 remains the same in the coupled state and therefore the torque or speed ratios in the superposition gear 110 are the same. When the clutch 245 closed, the power that is fed in via the auxiliary drives 106, 108 when the clutch 245 is open circulates via the clutch path that leads from the planet gear carrier 225 to the drive shaft 235 or to the ring gear 210 via the clutch 245. In addition, the motor power of the auxiliary drives 106, 108 is likewise supplied to the superposition gear 110 via the clutch path. The total power in the clutch path is thus quantitatively greater than the sum of the powers that the auxiliary drives 106, 108 impose. In this case, a simple transition from range I to range II results in a very high load in the clutch path from the planet gear carrier 225 to the drive shaft 235 or the ring gear 210, and consequently the components 225, 245, 260 must be considerably overdimensioned.

For the transition between ranges I and II, it is advantageous to reduce the resulting torque via the clutch path from the planet gear carrier 225 to the drive shaft 235 or the ring gear 210, so that clutch power and clutch wear may also be reduced.

It is proposed to prepare the opening or closing of clutch 245, i.e. the transition between ranges I and II, by setting an operating point at which the speed of the closed clutch 245 corresponds as closely as possible to the speeds of both sides of the opened clutch 245. If this is successful, the clutch 245 may be actuated in a synchronized fashion so that there is no power spike.

The open-clutch speed equilibrium is reached when the following Willis equation is fulfilled:

$$n1 - (i_{PG} \cdot n2) - \left((1 - i_{PG}) \cdot \left(\frac{n3}{i_{SG1}}\right)\right) = 0 \quad \text{(Equation 1)}$$

In addition, at the synchronization point the speed n2 of the main drive 104 must be the same regardless of whether the clutch 245 is open or closed. When the clutch 245 is closed, the following must therefore be true:

$$n2 = n3 \cdot i_{SG2} \quad \text{(Equation 2)}$$

If Equations 1 and 2 are at least approximately fulfilled, the clutch 245 may be opened or closed with minimum slippage. By inserting equation 1 into equation 2, the condition may be expressed not only for n2 and n3, but alternatively also as a function of the other speeds. The transmission ratio $i_{SG2}$ is selected in such a way that the speed at the synchronization point is within the control range of the drive device. In an embodiment with an auxiliary drive connection that acts from the auxiliary drive 106, 108 via gear stage 270 on the planet gear carrier 225, from there via gear stage 255 to the clutch 245 and via a further gear stage on the input shaft 235 and the ring gear 210, the following equation applies instead of equation 2, when the clutch 245 is closed:

$$n2 = n3 \cdot \left(\frac{i_{SG2}}{i_{SG3} \cdot i_{SG1}}\right) \quad \text{(Equation 3)}$$

For torque T, the following applies when the clutch 245 is open:

$$T1 + T2 + TS = 0 \quad \text{(Equation 4a)}$$

$$T1 = -T2/i_{PG} \quad \text{(Equation 4b)}$$

$$TS = TH_{auxiliary\ drive} * i_{SG1} \quad \text{(Equation 4c)}$$

$$TS = T1 * (i\_PG - 1) \quad \text{(Equation 4d)}$$

With clutch 245 closed, the following applies with regard to the torque:

$$Ts = T2 \cdot \left(\left(\frac{1}{i_{PG}}\right) - 1\right) + T_{Hilfsantrieb} \cdot i_{SG1} \quad \text{(Equation 5)}$$

Figure 6:
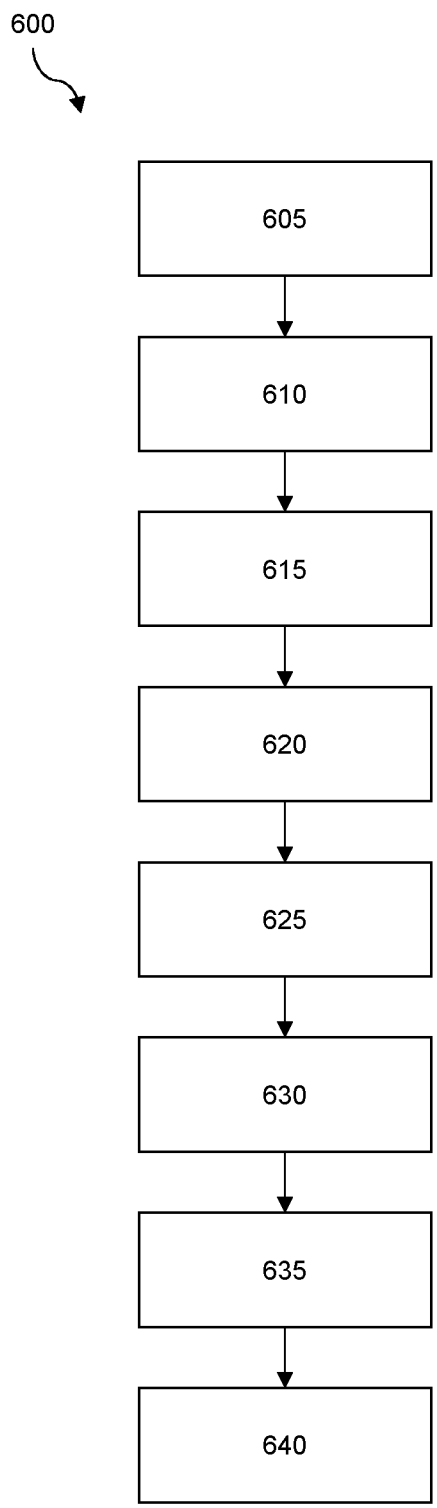
FIG. 6 a flow chart of a method for controlling a superposition gear.

FIG. 6 shows a flow chart of a method 600 for controlling a transition of a superposition gear 110 according to the type of FIG. 2 from range I to range II.

In a step 605, the superposition gear 110 operates in range I. Torque is transmitted via the auxiliary drives 106, 108, the clutch 245 is closed, and the main drive 104 is switched off, but is kept at a speed that is coupled to the speed of the output shaft 240 as a result of the connection via the clutch path.

In a step 610, the main drive 104 reaches a synchronization speed at least approximately equal to its rated speed. Although it is preferable to reach the speed as accurately as possible, it may be sufficient for the speed to lie within a range of approximately ±30%, preferably approximately ±15%, and more preferably approximately ±5%, around the synchronization speed. In a step 615, the main drive 104 is switched on, for example by connecting it to the main power supply 112 using the switching apparatus 114. As explained more precisely above, it may be necessary to superelevate the torque that the auxiliary drives 106, 108 provide, in order to allow the subsequent transition from range I to range II. In this case, the superelevation may be started in step 610.

In a step 620, the torque transmitted via the clutch 245 is compensated for by operating at least one of the auxiliary drives 106, 108 with generator power, i.e. as a controlled brake. The braking effect is dosed in such a way that equations 4c and 4d are fulfilled given a preset load torque T1 and speed of the main drive 104. The load torque T1 may, for example, be determined as a parameter value, constant, or as a function of the speed of the main drive 104. The speed of the main drive 104 may correspond to the rated speed or to a current speed of the main drive 104, which may be sampled using the associated speed sensor 280.

In another embodiment, T1 is determined from the motor power of the auxiliary drives 106 and/or 108 with or without considering the loss mechanisms in the superposition gear 110 or the auxiliary drives 106 and/or 108.

In yet another embodiment, T1 is determined based on the motor power of the main drive 104, while the auxiliary drives 106 and/or 108 are passive. Loss mechanisms in the superposition gear 110 and/or the main drive 104 may be taken into account.

In a further embodiment, a transmitted torque T1 is sampled on this basis on one of the shafts 235, 240 and 265 of the superposition gear 110, by means of the Willis equations (cf. Equations 1 and 2).

In a step 625, the clutch 245 is opened, for example by actuating the actuator 250. In a subsequent step 630, the torque that the auxiliary drives 106, 108 provide is maintained or adjusted to provide the supporting torque required in range II at the specified operating point of the driven machine 102.

In a step 635, the superposition gear 110 operates in range II at synchronization speed with an open clutch 245. If, for the transition from range I to range II, the auxiliary drives 106, 108 have been so controlled as to provide torque greater than their permanently available torque, the superelevation may be terminated after the range transition has taken place, at the latest in step 635. Then, in a step 640, operation in range II may be continued, and the speed of the output shaft 240 may be increased above the rated speed of the main drive 104 by controlling the speed of the auxiliary drives 106, 108.

Other variants of the method 600 may also be implemented. For example, in the steps mentioned, adjacent steps may be combined and executed in parallel or in parallel. Alternatively, adjacent steps may be swapped so that they are executed in reverse order. In a particularly preferred embodiment, steps 615 and 620 are carried out simultaneously or in parallel to compensate as far as possible for a torque surge that may occur when the main drive 104 is powered on.

In yet another embodiment of the method 600, the sequence of steps 615, 620, 625 is changed to 620, 625, 615. Already in step 610, the synchronization speed used is higher than the rated speed of the main drive 104. During steps 620 and 625, which are performed before the main drive 104 is turned on in step 615, the speed of the main drive 104 may decrease slightly again so that the main drive 104 is connected to the electrical power supply 112 at near its rated speed.

Figure 7:
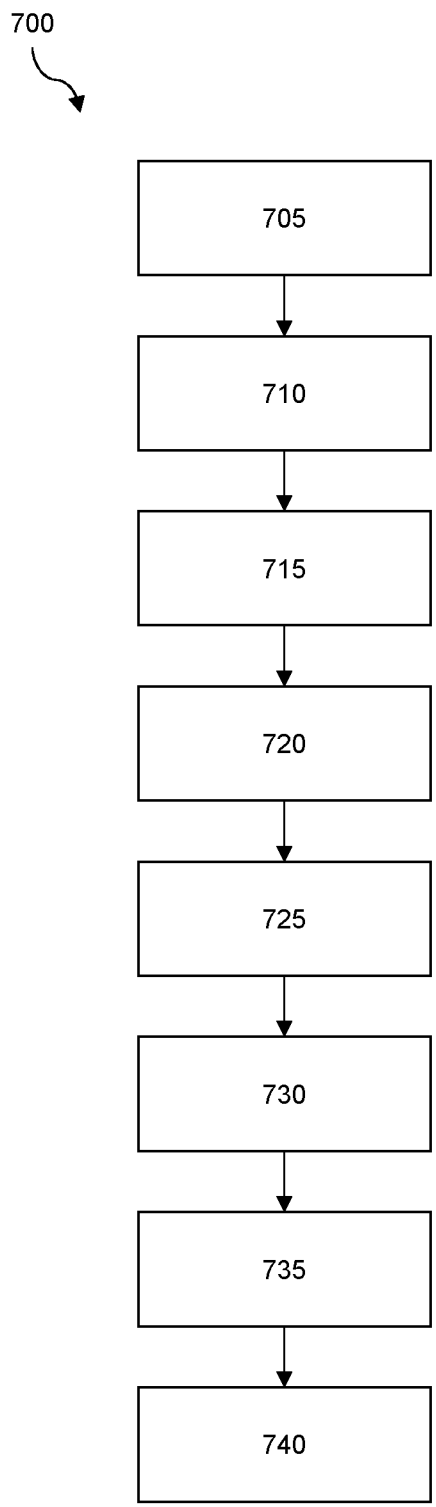
FIG. 7 another flow chart of a method for controlling a superposition gear.

FIG. 7 shows another flow chart of a method for controlling a transition of a superposition gear 110 of the type of FIG. 2 from range II to range I. Some of the steps indicated correspond substantially to, or are the reverse of, steps already described above with reference to FIG. 6.

In a step 705, the superposition gear 110 operates in range II. The clutch 245 is opened, the main drive 104 is engaged and the auxiliary drives 106, 108 provide additional torque. In a step 710, the superposition gear 110 reaches a synchronization speed that corresponds at least approximately to the rated speed of the main drive 104. Although it is preferable to reach the speed as accurately as possible, it may be sufficient for the speed to lie within a range of approximately ±30%, preferably approximately ±15%, and more preferably approximately ±5%, around the synchronization speed. As explained in more detail above, it may be necessary to superelevate the torque that the auxiliary drives 106, 108 provide, to allow the subsequent transition from range II to range I. In this case, the superelevation may be started in step 710.

In a step 715, the torque transmitted via the clutch 245 is compensated for by operating at least one of the auxiliary drives 106, 108 with generator power, i.e. as a controlled brake. The braking effect is dosed in such a way that equations 4c and 4d are fulfilled given a preset load torque T1 and speed of the main drive 104. Embodiments and variants for determining the load torque T1 are as set forth above with reference to step 620 of the method 620 [sic].

In a step 720, the clutch 245 is closed, and in particular is closed by means of the actuator 250. The main drive 104 is switched off, preferably by the switching apparatus 114 separating the main drive 104 from the main power supply 112. In a step 730, a torque is set that is applied by means of the auxiliary drives 106, 108 in order to keep the current speed n1 of the output shaft 240 constant. In a step 735, the superposition gear 110 operates at the synchronization speed in range II. If, for the transition from range II to range I, the auxiliary drives 106, 108 have been so controlled as to provide torque greater than their permanently available torque, the superelevation may be terminated after the range transition has taken place, at the latest in step 735. In a step 740, the speed of the output shaft 240 and thus of the driven machine 102 may be continuously controlled below the synchronization speed by controlling the auxiliary drives 106, 108 accordingly.

In this method, the specified steps may also be performed one after the other in the specified order. Successive steps may also be respectively performed concurrently or parallel to each other. Steps that may be performed in parallel may also be executed in the reverse of the specified sequence. In particular, steps 725 and 730 may be carried out in parallel in order to minimize as much as possible, or completely compensate, the drop in speed n1 on the output shaft 240 by the means of the motor torques of the auxiliary drives 106, 108.

In yet another embodiment, in the method 700, the sequence of steps 715, 720, 725 is changed to 725, 715, 720. In step 725, the main drive 104 is switched off. In step 715, the clutch torque is compensated by controlling the auxiliary drives 106, 108 with regenerative power; in step 720, the clutch 245 is closed. In this variant, too, successive steps may be performed in parallel or concurrently. Parts that may be parallelized may also be swapped in terms of their processing sequence.

REFERENCE SIGNS

100 Drive system
102 Driven machine
104 Main drive
106 First auxiliary drive
108 Second auxiliary drive
110 Superposition gear
112 Main electric power supply
114 Switching apparatus
116 First inverter
118 Second inverter
120 DC link
122 Supply apparatus
124 Auxiliary electric power supply
126 Controller
205 Planetary gear
210 Ring gear
215 Sun gear
220 Planet gear
225 Planet gear carrier
230 Bolts 235 Drive shaft
240 Output shaft
245 Clutch
250 Actuator
255 Gear stage
260 Transmission wheel
265 Auxiliary shaft
270 Gear stage
280 Speed sensor
285 Temperature sensor
400 Control diagram
405 Characteristic
410 Range
500 Control diagram
600 Method
605 Operate in range I
610 Synchronization speed
615 Switch on main drive
620 Compensate clutch torque by means of auxiliary drives
625 Open the clutch
630 Provide supporting torque
635 Synchronization speed
640 Operate in range II
700 Method
705 Operate in range II
710 Synchronization speed
715 Compensate clutch torque by means of auxiliary drives
720 Close the clutch
725 Switch off main drive
730 Set the torque
735 Synchronization speed
740 Operate in range I

The invention claimed is:

1. A drive system for a driven machine, the drive system comprising:
a main electric drive and a switching apparatus for connecting said main drive to a main electric power supply;
an auxiliary electric drive and a frequency converter for controlling a torque of said auxiliary drive;
an output shaft for connecting to the driven machine;
a planetary gear having a ring gear coupled to said main electric drive, a sun gear coupled to said output shaft, a planet gear, and a planet gear carrier coupled to said auxiliary drive;
a clutch path having a clutch for selectively connecting or disconnecting said planet gear carrier and an input shaft; and
a controller adapted to operate the drive system in a first range in which said clutch is closed and said switching apparatus is open, or in a second range in which said clutch is open and said switching apparatus is closed;
said controller being configured to superelevate a torque of said auxiliary drive over a torque that said auxiliary drive is able to output permanently, during a transition between the first and second ranges; and
said frequency converter being dimensioned to be able to output a given current permanently, and the given current being sufficient for operating the associated said auxiliary drive under overload.

2. The drive system according to claim 1, wherein said auxiliary electric drive is one of a plurality of auxiliary drives and said auxiliary drives are dimensioned such that, in a range that begins at a rated speed of said main drive, a sum of the torques that said auxiliary drives are able to provide permanently is less than a torque requirement of the driven machine.

3. The drive system according to claim 1, wherein said auxiliary drive is dimensioned such that, in a range that begins at a rated speed of said main drive, a torque that said auxiliary drive is able to provide permanently is less than a torque requirement of the driven machine.

4. The drive system according to claim 1, wherein said auxiliary drive comprises an asynchronous electric motor.

5. The drive system according to claim 1, which further comprises a temperature sensor on said auxiliary drive, and wherein said controller is configured to superelevate the torque of said auxiliary drive only when a sampled temperature lies below a predetermined threshold.

6. The drive system according to claim 1, which further comprises a temperature sensor at said frequency converter, and wherein said controller is configured to superelevate the torque of the associated said auxiliary drive only when a sampled temperature lies below a predetermined threshold.

7. The drive system according to claim 1, wherein said frequency converter is dimensioned to be able to output a given current permanently, and the given current is not sufficient to superelevate the torque of the associated said auxiliary drive.

8. A drive system for a driven machine, the drive system comprising:
a main electric drive and a switching apparatus for connecting said main drive to a main electric power supply;
a plurality of auxiliary electric drives and a frequency converter for controlling a torque of said auxiliary drives;
an output shaft for connecting to the driven machine;
a planetary gear having a ring gear coupled to said main electric drive, a sun gear coupled to said output shaft, a planet gear, and a planet gear carrier coupled to said auxiliary drives;
a clutch path having a clutch for selectively connecting or disconnecting said planet gear carrier and an input shaft; and
a controller adapted to operate the drive system in a first range in which said clutch is closed and said switching apparatus is open, or in a second range in which said clutch is open and said switching apparatus is closed;
said controller being configured to superelevate a torque output of said auxiliary drives over a torque that said auxiliary drives are able to output permanently, during a transition between the first and second ranges, and to superelevate the torques that said auxiliary drives provide in a staggered manner over time.

9. A method of controlling a drive system, the drive system including:
an main electric drive and a switching apparatus for connecting the main drive to a main electric power supply;
an auxiliary electric drive and a frequency converter for controlling a torque of the auxiliary drive;
an output shaft for connecting to a driven machine;
a planetary gear having a ring gear, a sun gear, a planet gear and a planet gear carrier, the ring gear being coupled to the main drive, the sun gear being coupled to the output shaft and the planet gear carrier being coupled to the auxiliary drive; and
a clutch path having a clutch for selectively connecting or disconnecting the planet gear carrier and an input shaft between the main electric drive and the ring gear;

the method comprising the following steps:
operating the drive system in a first range in which the clutch is closed and the switching apparatus is open, or in a second range in which the clutch is open and the switching apparatus is closed;
controlling the frequency converter in a superelevation mode in which a torque of the auxiliary drive is increased beyond a torque that the auxiliary drive is able permanently to provide;
changing an operating range; and
ending the superelevation mode.

* * * * *